US008723463B2

(12) United States Patent
Lin et al.

(10) Patent No.: US 8,723,463 B2
(45) Date of Patent: May 13, 2014

(54) MOTOR CONTROL APPARATUS AND METHOD THEREOF

(75) Inventors: Chien-Sheng Lin, Taoyuan Hsien (TW); Zong-Hong Tang, Taoyuan Hsien (TW); Wen-Chuan Ma, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 634 days.

(21) Appl. No.: 12/792,456

(22) Filed: Jun. 2, 2010

(65) Prior Publication Data

US 2011/0043148 A1 Feb. 24, 2011

(30) Foreign Application Priority Data

Aug. 19, 2009 (TW) .............................. 98127782 A (51) Int. Cl.
*H03K 5/00* (2006.01)
(52) U.S. Cl.
USPC ............ 318/400.13; 318/400.01; 318/400.06; 318/400.07; 318/400.14
(58) Field of Classification Search
USPC ............ 318/400.13, 400.01, 400.06, 400.07, 318/400.14
See application file for complete search history.

(56) References Cited

U.S. PATENT DOCUMENTS

| 5,463,299 A * | 10/1995 | Futami et al. ................. 318/618 |
| 5,675,231 A | 10/1997 | Becerra et al. |
| 5,825,597 A | 10/1998 | Young |
| 6,411,002 B1 | 6/2002 | Smith et al. |
| 7,135,827 B1 | 11/2006 | Lampson |
| 2003/0067280 A1 | 4/2003 | Wang et al. |
| 2004/0145330 A1* | 7/2004 | Maslov et al. ................ 318/437 |
| 2004/0155613 A1* | 8/2004 | Sugiyama et al. ............ 318/254 |
| 2006/0125439 A1* | 6/2006 | Ajima et al. .................. 318/716 |

FOREIGN PATENT DOCUMENTS

| CN | 100426651 C | 10/2008 |
| EP | 1 581 029 A1 | 9/2005 |
| TW | 260221 | 10/1995 |
| TW | 465163 B | 11/2001 |
| TW | 200635202 | 10/2006 |
| TW | 200410600 | 6/2007 |

\* cited by examiner

*Primary Examiner* — Erick Glass
(74) *Attorney, Agent, or Firm* — Muncy, Geissler, Olds & Lowe, P.C.

(57) ABSTRACT

A motor control apparatus includes a phase sensing circuit, a current sensing circuit, a controller and a driving circuit. The driving circuit receives a first driving signal and then controls a phase switching state of the magnetic pole of the motor so as to drive the motor in accordance with the first driving signal. The phase sensing circuit detects the phase switching state of the magnetic pole to generate and output a phase switching signal to the controller during the motor is operating. The current sensing circuit detects a current flowing through the motor to generate and output a current phase signal to the controller. The controller compares a phase difference between the phase switching signal and the current phase signal to generate and output a second driving signal to the driving circuit. The driving circuit controls the phase switching state of the magnetic pole for driving the motor in accordance with the second driving signal.

26 Claims, 7 Drawing Sheets

MOTOR CONTROL APPARATUS AND METHOD THEREOF

CROSS REFERENCE TO RELATED APPLICATIONS

This Non-provisional application claims priority under 35 U.S.C. §119(a) on Patent Application No(s). 098127782 filed in Taiwan, Republic of China on Aug. 19, 2009, the entire contents of which are hereby incorporated by reference.

BACKGROUND OF THE INVENTION

1. Field of Invention

The present invention relates to a motor control apparatus, which can synchronize the phases of a phase switching signal and a current phase signal so as to promote operation efficiency of the motor.

2. Related Art

Figure 1:
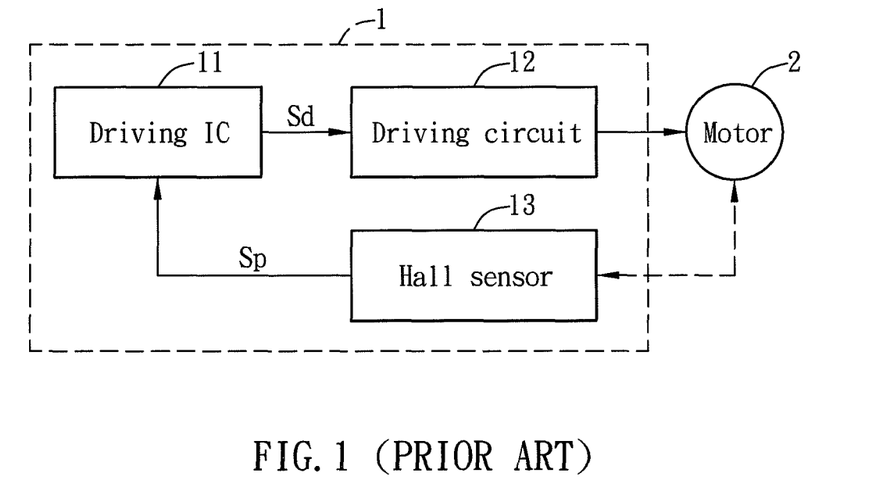
FIG. 1 is a circuit block diagram of a conventional motor control apparatus.

Conventional motor operation is enabled through interaction between a stator and a rotor, which are two major components in the motor, oppositely disposed in a motor. By providing magnetic attraction and magnetic field variation, the motor can induce a rotation of the rotor corresponding to the stator. In the motor operation, the magnetic field variation represents commutation of the magnetic pole of the motor. As shown in FIG. 1, a current motor 2 generally uses an electronic phase converter for commutation. In more detailed, the electronic phase converter regularly uses a Hall sensor 13 to detect the position (or the magnetic field variation) of the magnetic pole of the motor 2 for determining the rotor position. The driving integrated circuit 11 then outputs a driving signal Sd to a driving circuit 12 in order to control the coil currents in the stator of the motor 2 to switch mutually for commutation in accordance with the phase switching signal Sp generated by the Hall sensor 13.

Figure 2:
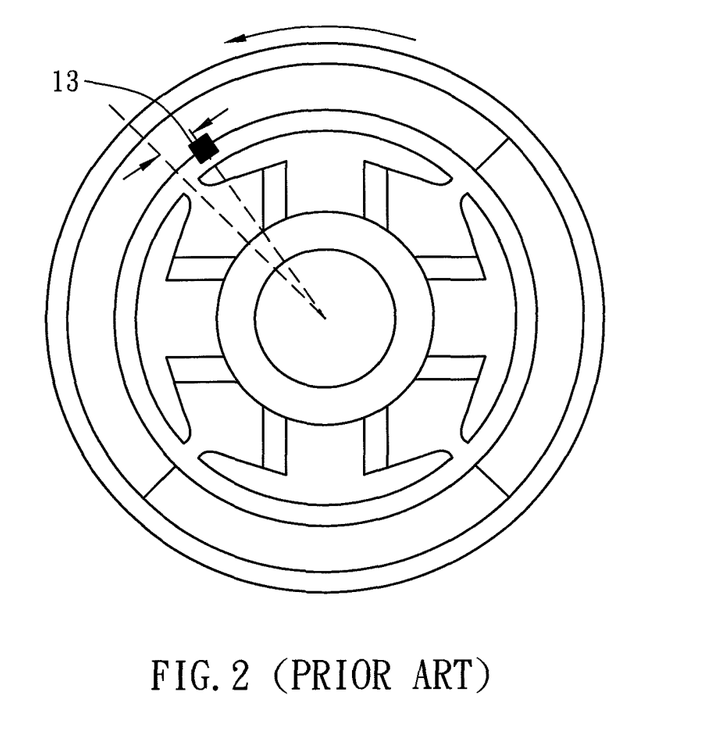
FIG. 2 is a schematic diagram showing a disposition position of a conventional Hall sensor disposed on a stator of a motor.
Figure 3A:
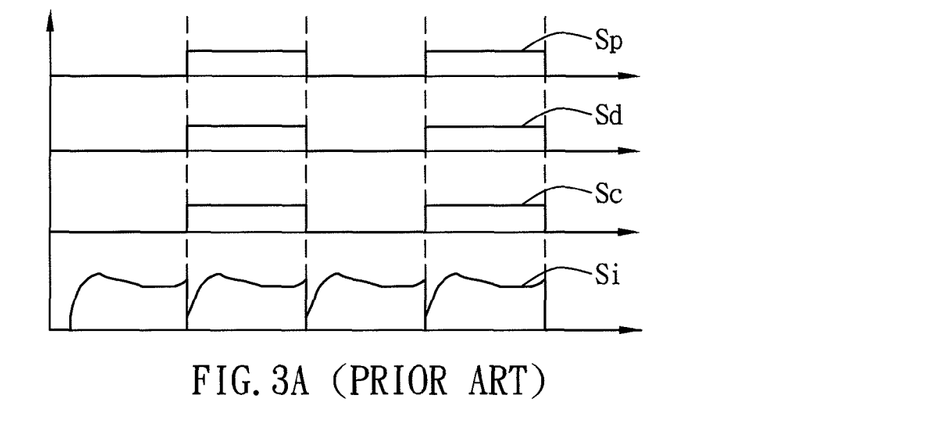
FIGS. 3A to 3C are schematic diagrams of waveforms for all sorts of the signals detected by the motor control apparatus of FIG. 1 during the motor is at the conditions of the rating voltage and rotating speed, the raised voltage or the reduced voltage.

Moreover, the detecting ability of the Hall sensor 13 for the magnetic field variation depends on the rotating speed of the motor 2 and the disposed position of the Hall sensor 13. Therefore, the Hall sensor 13 must be arranged on the most feasible position for accurate detection. As shown in FIG. 2, the Hall sensor 13 in the conventional direct-current (DC) brushless motors is always purposely disposed forwardly (between the slot openings of the silicon steel plates of the motor 2, and closer to one of the silicon steel plates) for leading commutation in order to promote the motor efficiency at rating rotating speed and form current waveform Si as shown in FIG. 3 (the current with higher efficiency presents an evener waveform).

Figure 3B:
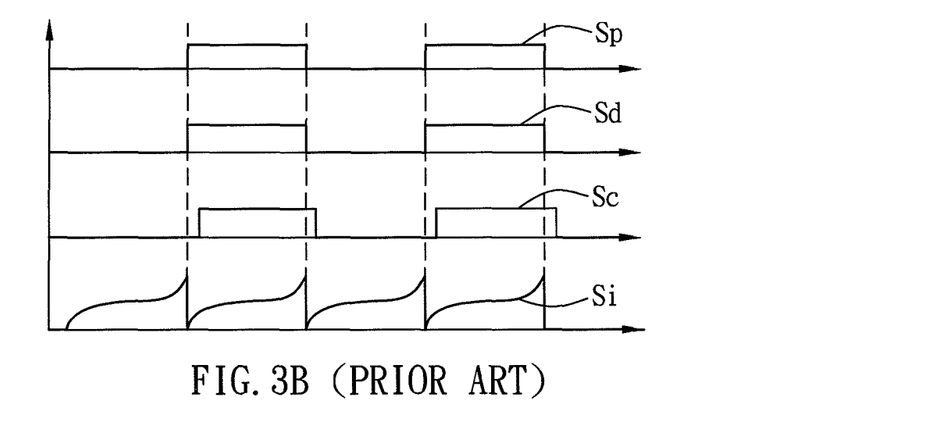
Figure 3C:
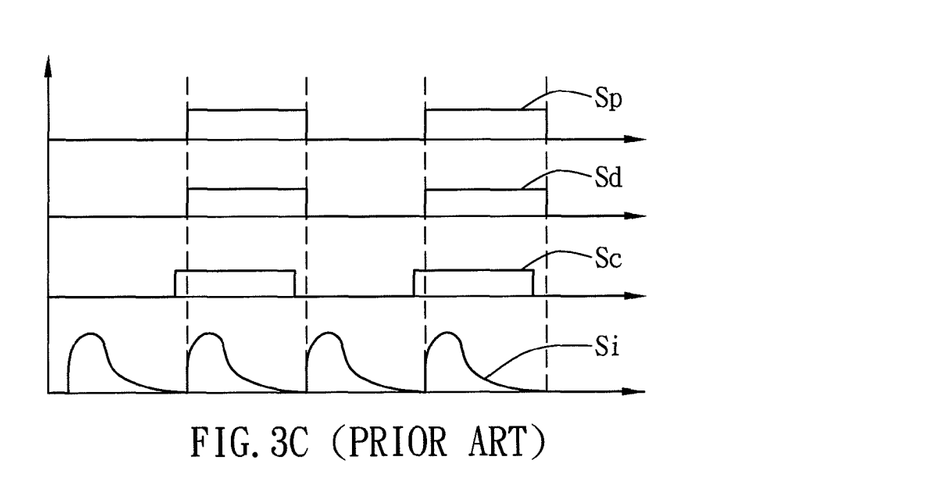

However, the Hall sensor 13 cannot automatically shift to a feasible position after the rotating speed of the motors 2 is changed. Once the rotating speed of the motor 2 is controlled at a slow speed, the motor 2 efficiency declines from the optimal status and the current waveform is not as even as the original. As shown in FIGS. 3B and 3C, when the loading is changed (when the fan is in back pressure) or the voltage source is changed, it probably results in a leading or lagging magnetic phase of the phase switching signal Sp detected by the Hall sensor 13, which causes the motor 2 efficiency falls from the optimal point as well. Meanwhile, the current of the motor 2 is either leading (with a protruding front portion) or lagging (a protruding back portion) can be indicated from the current waveform Si of the motor 2. Because of it, the driving IC may output an improper driving signal Sd to the driving circuit 12 so as to cause an unsmooth commutation of the motor 2 and induce noise. Particularly, when the motor 2 is used for fan application, the heat dissipation efficiency of the fan is consequently decreased.

SUMMARY OF THE INVENTION

In view of the foregoing, the present invention provides a motor control apparatus and a motor controlling method, which can promote the operation efficiency of the motor and reduce the noise (vibration) during the motor's operating.

To achieve the above, the present invention provides a motor control apparatus, which includes a phase sensing circuit, a current sensing circuit, a controller and a driving circuit. The driving circuit receives a first driving circuit and then control a phase switching state of a magnetic pole of the motor so as to drive the motor in accordance with the first driving signal. The phase sensing circuit detects the phase switching state of the magnetic pole to generate and output a phase switching signal to the controller when the motor is operating. The current sensing circuit detects a current flowing through a coil of the motor to generate and output a current phase signal to the controller. The controller receives the phase switching signal and the current phase signal respectively. Additionally, the controller compares the phase switching signal with the current phase signal to generate a phase difference and then adjusts the first driving signal in accordance with the phase difference so as to generate and output a second driving signal to the diving circuit for driving the motor.

Consequently, the motor control method of the present invention can adjust the original first driving signal by the controller in accordance with the phase difference between the phase switching signal and the current phase signal of the detected motor, and then outputs the adjusted second driving signal for driving the motor. Therefore, even if the motor is operated at different rotating speeds, or the power terminals or the loadings have variations, the motor control method still can provide immediately and properly phase adjustment for the driving signal of the motor, sustainably and promptly, in accordance with the error value generated from the feed-backed sensing signals. Thus, the motor control method can synchronize the phases of the phase switching signal and the current phase signal so as to provide the motor with higher operation efficiencies and current waveform with even shape.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 4:
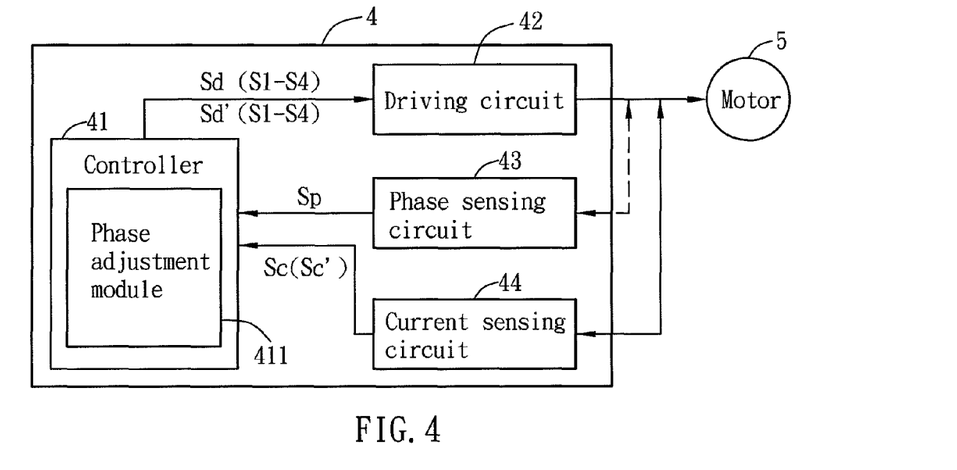
FIG. 4 is a circuit block diagram of a motor control apparatus of the present invention.

As shown in FIG. 4, a motor control apparatus 4 of a preferred embodiment of the present invention is electrically connected to a motor 5 and includes a controller 4, a driving circuit 42, a phase sensing circuit 43 and a current sensing circuit 44. The controller 41 is electrically connected the driving circuit 42, the phase sensing circuit 43 and the current sensing circuit 44 respectively. The driving circuit 42 is electrically connected to the motor 5. The current sensing circuit 44 is electrically connected to the motor 5 and the driving circuit 42, respectively. In addition, the motor 5 can be a direct-current brushless motor.

Figure 5:
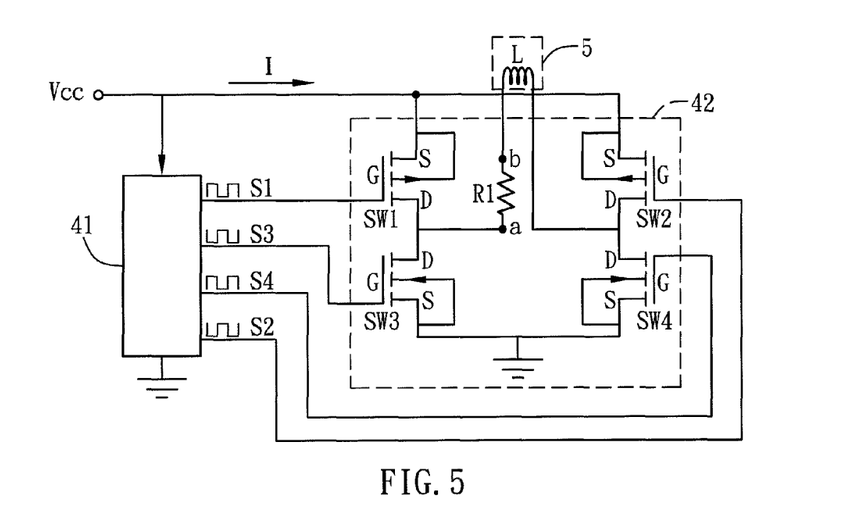
FIG. 5 is a circuit schematic diagram of the motor control apparatus according to a first preferred embodiment of the present invention.

Referring to FIG. 5, the driving circuit 42 is, for example, a full-bridge (H-bridge) circuit, which at least includes a first switch element SW1 and a second switch element SW2 of upper halves of the H-bridge circuit and a third switch element SW3 and a fourth switch element SW4 of lower halves of the H-bridge circuit. The switch elements SW1 to SW4 are electrically connected between a coil L of the motor 5 and the controller 41, and each of the switch elements SW1 to SW4 can be a metal-oxide-semiconductor field-effect transistor (MOSFET). For example, the first switch element SW1 and the second switch element SW2 can be PMOS (such transistor representing the channels of these two elements are P-type), and the third switch element SW3 and the fourth switch element SW4 can be NMOS (such transistor representing the channels of these two elements are N-type). The followings are the electrical connections of the above-mentioned full-bridge circuit: a drain D of the first switch element SW1 and a drain D of the second switch element SW2 of the upper halves are electrically connected to the both ends of the coil L of the motor 5 respectively, a source S of the first switch element SW1 and a source S of the second switch element SW2 are electrically connected to a power supply Vcc respectively, a gate G of the first switch element SW1 and a gate G of the second switch element SW2 are electrically connected to the controller 41 respectively, a drain D of the third switch element SW3 and a drain D of the fourth switch element SW4 are electrically connected to the both ends of the coil L of the motor 5, respectively, and also electrically connected to the drains D of the first and second switch elements SW1 and SW2, respectively, a gate G of the third switch element SW3 and a gate G of the fourth switch element SW4 are electrically connected to the controller 41, respectively, and a source S of the third switch element SW3 and a source S of the fourth switch element SW4 are electrically connected to a grounding terminal.

The phase sensing circuit 43 can be a Hall sensor or a photo coupler, etc. The Hall sensor is exemplified in the present embodiment. The Hall sensor is disposed between the slot openings of silicon steel plates of the motor 5 (between the magnetic poles) in order to detect the phase switching state of the magnetic pole during the motor 5 is operating for further generating and outputting a phase switching signal Sp to a first input end of the controller 41.

Figure 6A:
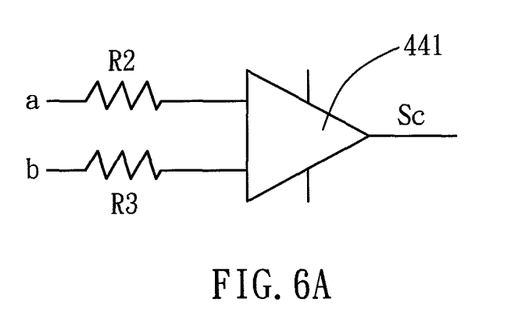
FIG. 6A is a circuit diagram showing a part of the current sensing circuit (not including the first resistor R1) according to the first preferred embodiment of the present invention.

Further referring to FIGS. 5 and 6A, the current sensing circuit 44 is for detecting and measuring a current flowing through the coil L of the motor 5 to generate and output a current phase signal Sc to a second input end of the controller 41. Moreover, the current sensing circuit 44 can include a first resistor R1, a second resistor R2, a third resistor R3 and a first comparator 441. A first end of the first resistor R1 (end b shown in FIG. 5) is electrically connected to the coil L of the motor 5. A second end of the first resistor (end a shown in FIG. 5) is electrically connected to the drains D of the first and third switch elements SW1 and SW3. Additionally, a first input end and a second input end of the first comparator 441 are electrically connected to the second and third resistors R2 and R3, respectively, and then electrically connected to the first and second ends of the first resistor R1, respectively. A first output end of the first comparator 441 is electrically connected to a second input end of the controller 41.

Figure 6B:
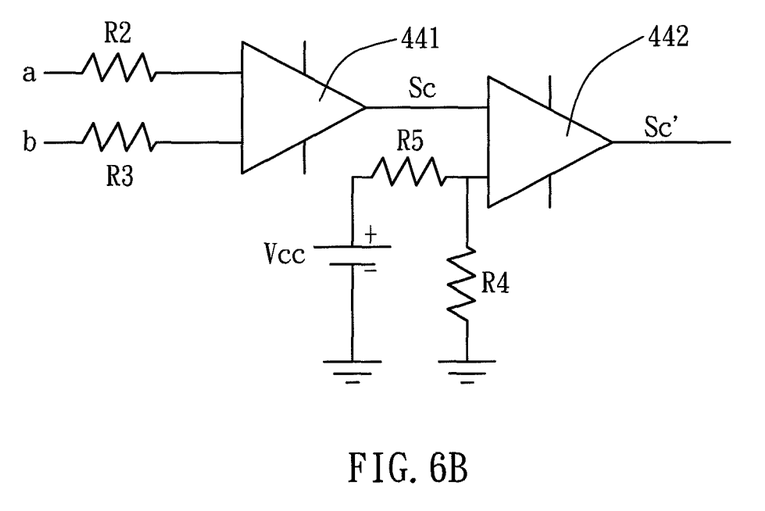
FIG. 6B is a circuit diagram showing a part of the current sensing circuit (not including the sixth and seventh resistors R6 and R7) according to a second preferred embodiment of the present invention.

As shown in FIG. 6B, for reducing the noise of the current phase signal Sc outputted by the first comparator 441 to generate a much cleaner current phase signal Sc', the output end of the first comparator 441 can be further electrically connected to a first input end of a second comparator 442 and, meanwhile, a second input end of the second comparator 442 is electrically connected to a first end of a fourth resistor R4 and a first end of a fifth resistor R5. Additionally, a second end of the fourth resistor R4 is grounded, and a second end of the fifth resistor R5 is electrically connected to the power supply Vcc and then grounded. An output end of the second comparator 442 is electrically connected to the second input end of the controller 41. In the above-mentioned embodiment, the resistor values of the second and third resistors R2 and R3 can be fairly low values such as 0.1Ω (Ohm), and the resistor values of the fourth and fifth resistors R4 and R5 can be the same.

Figure 7:
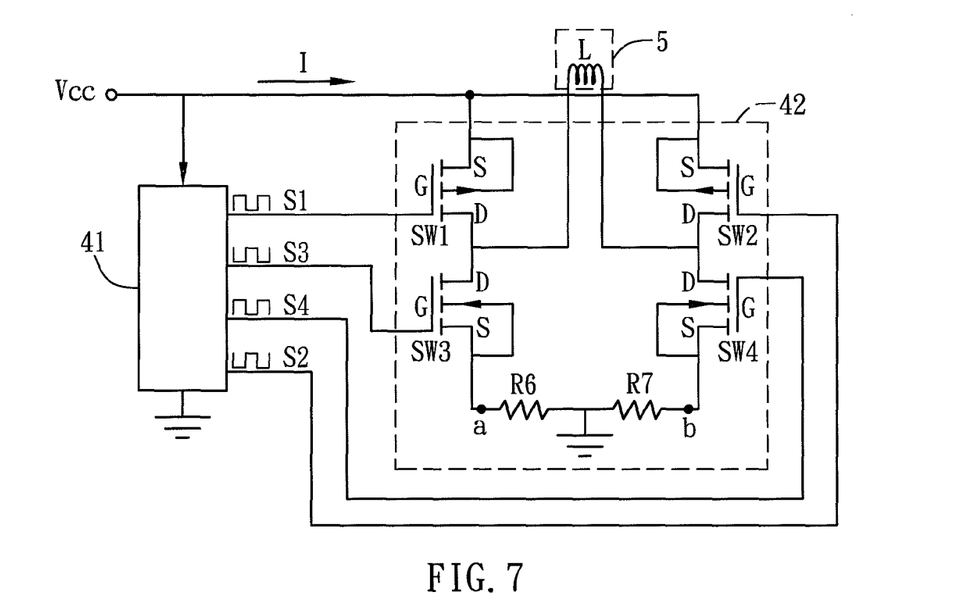
FIG. 7 is a circuit schematic diagram of the motor control apparatus according to the second preferred embodiment of the present invention.

Otherwise, as shown in FIG. 7, although the circuit connection mode between the current sensing circuit 44 and the driving circuit 42 in accordance with the embodiment is different, it is still feasible to obtain the current phase signal Sc or Sc'. The current sensing circuit 44 includes the second resistor R2, the third resistor R3, a sixth resistor R6, a seventh resistor R7 and the first comparator 441. A first end of the sixth resistor R6 (end a shown in FIG. 7) and a first end of the seventh resistors R7 (end b shown in FIG. 7) are electrically connected to the sources S of the third and fourth switch elements SW3 and SW4, and a second end of the sixth resistor R6 and a second end of the seventh resistors R7 are grounded. The first and second input ends of the first comparator 441 are electrically connected to the second and third resistors R2 and R3, respectively, and then electrically connected to the first ends of the sixth and seventh resistors R6 and R7, respectively. The output end of the first comparator 441 is still electrically connected to the second input end of the controller 41. Similarly, for reducing the signal noise outputted by the first comparator 441, the output end of the first comparator 441 can be further connected to a second comparator 442 with the electrical connection mode as shown in FIG. 6, so the detailed description thereof will be omitted.

The controller 41 can be an programmable integrated circuit (IC) such as a central processor unit (CPU), a microcontroller (MCU) or a programmable gate array (FPGA or CPLD) etc or an application-specific integrated circuit (ASIC). Additionally, a phase adjustment module 411 is built in the controller 41, and it can be a program, a logic gate, a sequential circuit or a combination of at least two of the above-mentioned items. The above-mentioned controller 41 is electrically connected to the gates G of the first, second, third and fourth switch elements SW1 to SW4 of the driving circuit 42, respectively, for outputting a first driving signal Sd (e.g. S1 to S4) to each of the switch elements SW1 to SW4.

As shown in FIGS. 4, 5 and 6A, the controlling method of the motor control apparatus of the present invention will be described hereinafter:

The current sensing circuit 43 detects the phase switching state of the magnetic pole to generate and output the phase switching signal Sp to the phase adjustment module 411 of the controller 41 during the motor 5 is operating.

Figure 8:
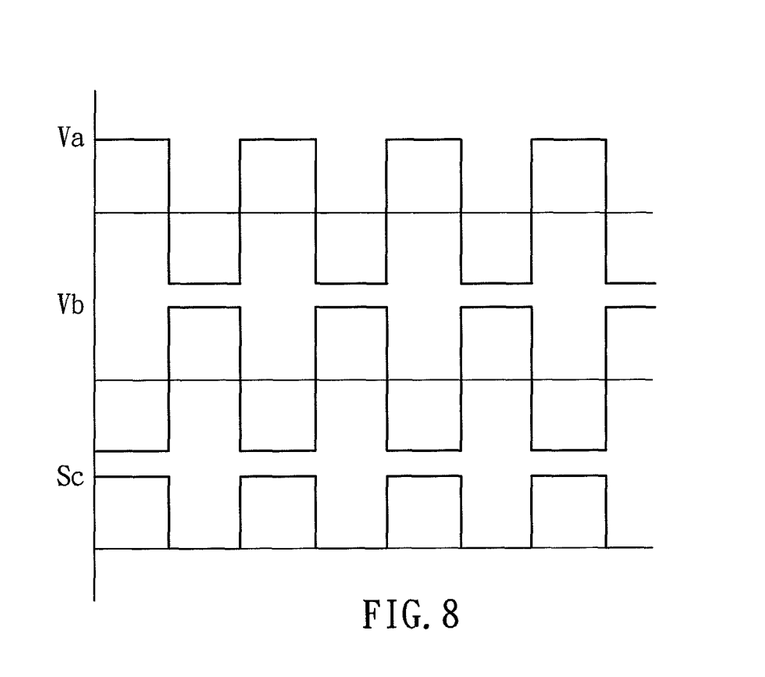
FIG. 8 is a schematic diagram showing the waveform of the current phase signal generated by the current sensing circuit of the present invention.

Referring to FIG. 8, because the switch elements SW1 to SW4 are conducted by turns (i.e. when the switch elements SW1 and SW4 are turned on, the switch elements SW2 and SW3 are turned off; when the switch elements SW2 and SW3 are turned on, the switch elements SW1 and SW4 are turned off), the current sensing circuit 44 enables the first comparator 441 to process two inputted current signals Va and Vb, which are inputted at the ends a and b of the comparator 441 (i.e. when Va>Vb, the first comparator 441 outputs a Vcc voltage; when Va<Vb, it outputs a zero voltage), and then output them as the current phase signal Sc to the phase adjustment module 411 of the controller 41. As shown in FIG. 6B, the first comparator 441 also can output the current phase signal Sc to the first input end of the second comparator 442. Then, the more stable current phase signal Sc' can be generated through comparing with a half of Vcc power supply (by dividing the power supply Vcc with the fourth and fifth resistors R4 and R5), which is inputted at the second inputted end of the second comparator 442, and then outputted to the phase adjustment module 411.

Figure 9:
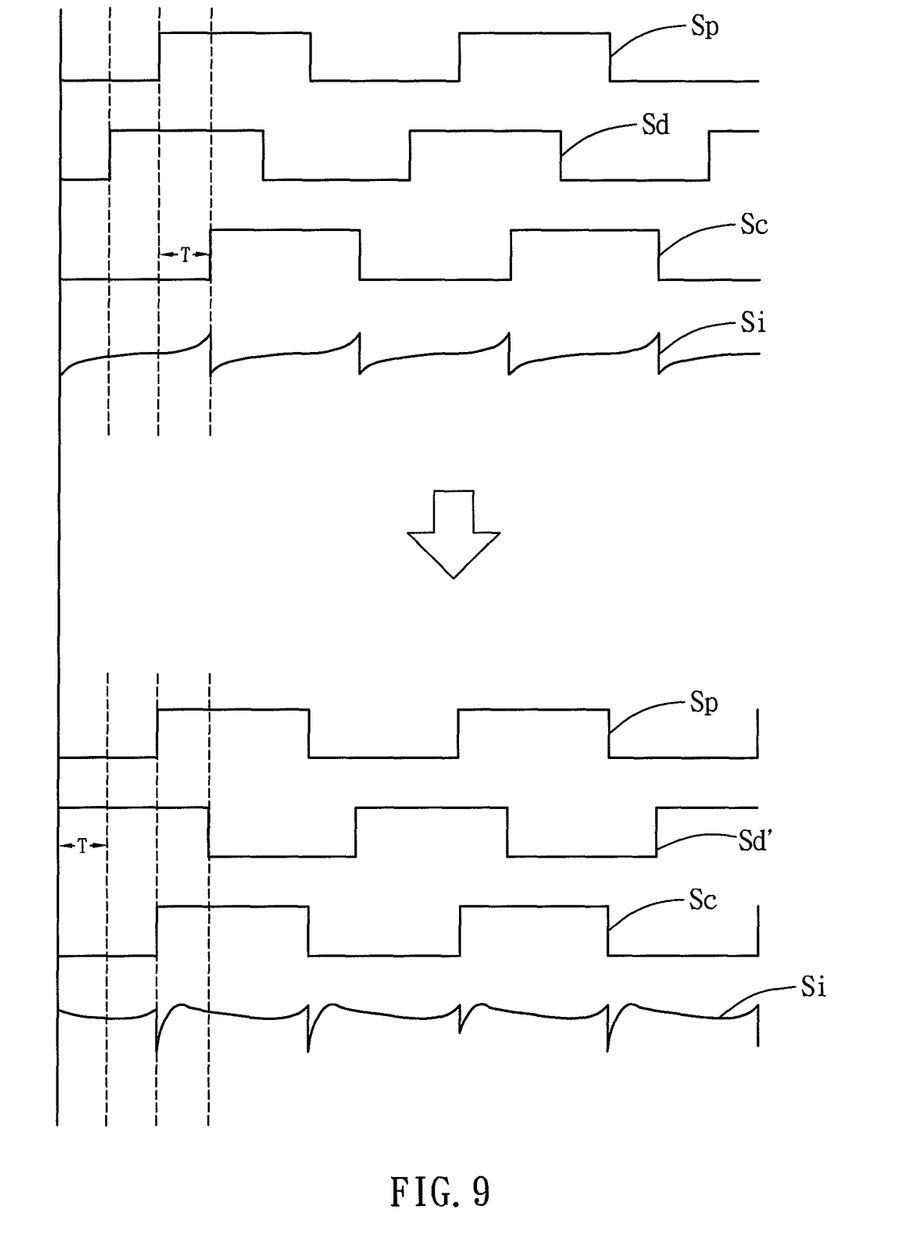
FIG. 9 is a schematic diagram showing the waveform for all sorts of the signals after the motor control apparatus implements the leading phase adjustment.
Figure 10:
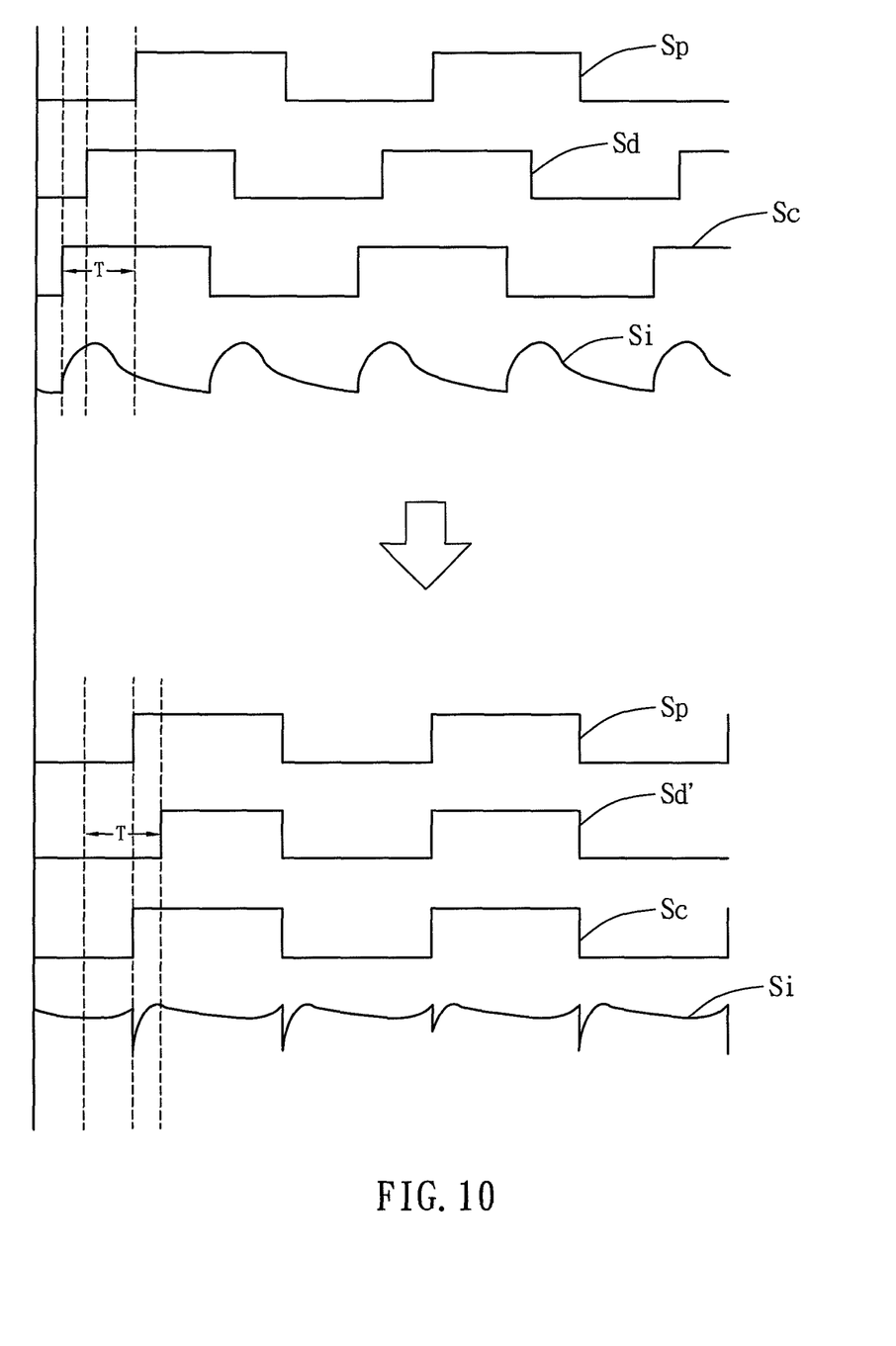
FIG. 10 is a schematic diagram showing the waveform for all sorts of the signals after the motor control apparatus implements the lagging phase adjustment.

As shown in FIGS. 9 and 10, the phase adjustment module 411 inside the controller 41 compares the phase switching signal Sp with the current phase signal Sc or Sc' to generate the phase difference T after receiving them respectively. Then, the phase adjustment module 411 adjusts the phase time of the original first driving signal Sd to generate the processed second driving signal Sd' in accordance with the phase difference T. For example, as shown in FIG. 9, that the current phase signal Sc or Sc' is lagging the phase switching signal Sp with a phase time T results in an uneven signal waveform Si (with a protruding rear portion), which indicates a low motor efficiency. Therefore, the phase of the first driving signal Sd is advanced by the phase time T to form the processed second driving signal Sd'.

Otherwise, as shown in FIG. 10, that the current phase signal Sc or Sc' is leading the phase switching signal Sp with a phase time T results in an uneven signal waveform Si (with a protruding front portion), which indicates a low motor efficiency. Therefore, the phase of the first driving signal is lagged for the phase time T to generate the processed second driving signal Sd'.

Additionally, the controller 41 outputs four processed second driving signals Sd' to four switch elements SW1 to SW4 of the driving circuit 42, respectively, to control switching on/off of the four switch elements SW1 to SW4 by turns and further control the phase switching state of the magnetic pole of the motor 5. Therefore, the phase of the later detected phase switching signal Sp can synchronize with that of the current phase signal Sc or Sc'. It also represents that the zero-crossing point of the current phase signal Sc or Sc' can correspond to the phase-switching point of the phase switching signal Sp. Eventually, the even waveform Si can indicate a high motor efficiency.

In summary, the present invention processes the first driving signal Sd with lagging or leading phase adjustment by the phase adjustment module 411 of the controller 41 in accordance with the phase difference between the current phase signal Sc and the phase sensing signal Sp, and then generates the processed second driving signal Sd' for driving the motor. Therefore, even if the motor is operated at different rotating speeds, or the power terminals or the loadings have variations, the motor control apparatus and the controlling method thereof still can provide immediate and proper phase adjustment for the driving signal of the motor, sustainably and promptly, in accordance with the error values generated from the feed-backed sensing signals. Thus, they can synchronize the phases of the phase switching signal and the current phase signal for the motor to operate with an evener waveform and perform a better (or superior) operation efficiency.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A motor control apparatus electrically connected to a motor, the motor control apparatus comprising:
   a driving circuit, receiving a first driving signal and then controlling a phase switching state of a magnetic pole of the motor so as to drive the motor to operate in accordance with the first driving signal;
   a phase sensor, detecting the phase switching state of the magnetic pole to generate a phase switching signal when the motor is operating;
   a current sensing circuit, detecting a current flowing through a coil of the motor to generate a current phase signal; and
   a controller, receiving the phase switching signal and the current phase signal respectively, wherein the controller compares the phase switching signal with the current phase signal to generate a phase difference and then adjusts the first driving signal in accordance with the phase difference to generate and output a second driving signal to the diving circuit for driving the motor to operate;
   wherein the controller comprises a phase adjustment module for receiving the phase switching signal and the current phase signal respectively, and the controller compares the phase switching signal with the current phase signal to generate the phase difference and then adjusts the first driving signal in accordance with the phase difference to generate the second driving signal.

2. The motor control apparatus of claim 1, wherein the phase sensing circuit is a Hall sensor or a photo coupler.

3. The motor control apparatus of claim 1, wherein the controller is an integrated circuit (IC), a central processor unit (CPU), a microcontroller (MCU), a programmable gate may (FPGA or CPLD) or an application-specific integrated circuit (ASIC).

4. The motor control apparatus of claim 1, wherein the driving circuit is a full-bridge circuit, comprising a first switch element, a second switch element, a third switch element and a fourth switch element, all of which are electrically connected between the coil of the motor and the controller.

5. The motor control apparatus of claim 4, wherein each of the switch elements is a metal-oxide-semiconductor field-effect transistor (MOSFET).

6. The motor control apparatus of claim 4, wherein the controller outputs the second driving signals to the switch elements respectively, and the switch elements are switched on or off by turns in accordance with the second driving signals to control the phase switching state of the magnetic pole for driving the motor.

7. The motor control apparatus of claim 4, wherein the current sensing circuit comprises a first resistor and a first comparator, a first end of the first resistor is electrically connected to the coil of the motor, a second end of the first resistor is electrically connected to the first and third switch elements, a first input end and a second input end of the first comparator are electrically connected to a second resistor and a third resistor, respectively, and then electrically connected to the first and second ends of the first resistor, respectively, and an output end of the first comparator is electrically connected to the controller.

8. The motor control apparatus of claim 4, wherein the current sensing circuit comprises a first resistor, a first comparator and a second comparator, a first end of the first resistor is electrically connected to the coil of the motor, a second end of the first resistor is electrically connected to the first and third switch elements of the driving circuit, a first input end and a second input end of the first comparator are electrically connected to a second resistor and a third resistor, respectively, and then electrically connected to the first and second ends of the first resistor, respectively, an output end of the first comparator is electrically connected to a first input end of the second comparator, a second input end of the second comparator is electrically connected to a first end of a fourth resistor and a first end of a fifth resistor, a second end of the fourth resistor is grounded, a second end of the fifth resistor is connected to a power supply and then grounded, and an output end of the second comparator is electrically connected to the controller.

9. The motor control apparatus of claim 4, wherein the current sensing circuit comprises a sixth resistor, a seventh resistor and a first comparator, a first end of the sixth resistor and a first end of the seventh resistor are electrically connected to a source of the third switch element and a source of the fourth switch element, respectively, a second end of the sixth resistor and a second end of the seventh resistor are grounded, a first input end and a second input end of the first comparator are electrically connected to a second resistor and a third resistor, respectively, and then electrically connected to the first ends of the sixth and seventh resistors, respectively, and an output end of the first comparator is electrically connected to the controller.

10. The motor control apparatus of claim 4, wherein the current sensing circuit comprises a sixth resistor, a seventh resistor, a first comparator and a second comparator, a first end of the sixth resistor and a first end of the seventh resistor are electrically connected to a source of the third switch element and a source of the fourth switch element, respectively, a second end of the sixth resistor and a second end of the seventh resistor are grounded, a first input end and a second input end of the first comparator are electrically connected to a second resistor and a third resistor, respectively, and then electrically connected to the first ends of the sixth and seventh resistors, respectively, an output end of the first comparator is electrically connected to a first input end of the second comparator, a second input end of the second comparator is electrically connected to a first end of a fourth resistor and a first end of a fifth resistor, a second end of the fourth resistor is grounded, a second end of the fifth resistor is electrically connected to a power supply and then grounded, and an output of the second comparator is electrically connected to the controller.

11. The motor control apparatus of claim 1, wherein the motor is a direct-current (DC) brushless motor.

12. A motor control method, comprising steps of:
detecting a phase switching state of a magnetic pole of an operating motor to generate a phase switching signal in accordance with a first driving signal;
detecting a current flowing through a coil of the motor to generate a current phase signal;
comparing the phase switching signal with the current phase signal to generate a phase difference and then adjusting a phase time of the first driving signal in accordance with the phase difference to generate a second driving signal; and
driving the motor to operate in accordance with the second driving signal;
wherein the controller comprises a phase adjustment module for receiving the phase switching signal and the current phase signal respectively, and the controller compares the phase switching signal with the current phase signal to generate the phase difference and then adjusts the first driving signal in accordance with the phase difference to generate the second driving signal.

13. The motor control method of claim 12, wherein the phase switching signal is generated by a phase sensing circuit.

14. The motor control method of claim 13, wherein the phase sensing circuit a Hall sensor or a photo coupler.

15. The motor control method of claim 12, wherein the current phase signal is generated by a current sensing circuit.

16. The motor control method of claim 12, wherein the step of adjusting the first driving signal to generate the second driving signal is executed by a controller.

17. The motor control method of claim 16, wherein the controller is a integrated circuit (IC), a central processor unit (CPU), a microcontroller (MCU), a programmable gate array (FPGA or CPLD) or a application-specific integrated circuit (ASIC).

18. The motor control method of claim 12, wherein the step of driving the motor to rotate in accordance with the second driving signal is executed by a driving circuit.

19. The motor control method of claim 18, wherein the driving circuit is a full-bridge circuit.

20. A motor control apparatus electrically connected to a motor, comprising:
a driving circuit receiving a first driving signal and then controlling a phase switching state of a magnetic pole of the motor so as to drive the motor to operate in accordance with the first driving signal;
a phase sensor detecting the phase switching state of the magnetic pole to generate a phase switching signal when the motor is operating;
a current sensing circuit detecting a current flowing through a coil of the motor to generate a current phase signal, wherein the current sensing circuit comprises a first resistor, a second resistor, and a first comparator electrically connected to the first resistor and the second resistor;
a controller receiving the phase switching signal and the current phase signal, respectively, wherein the controller compares the phase switching signal with the current phase signal to generate a phase difference and then adjusts the first driving signal in accordance with the phase difference to generate and output a second driving signal to the diving circuit for driving the motor to operate.

21. The motor control apparatus of claim 20, wherein the controller comprises a phase adjustment module for receiving the phase switching signal and the current phase signal, respectively, and the controller compares the phase switching signal with the current phase signal to generate the phase difference and then adjusts the first driving signal in accordance with the phase difference to generate the second driving signal.

22. The motor control apparatus of claim 20, wherein the controller is an integrated circuit (IC), a central processor unit (CPU), a microcontroller (MCU), a programmable gate array (FPGA or CPLD) or an application-specific integrated circuit (ASIC).

23. The motor control apparatus of claim 20, wherein the driving circuit is a full-bridge circuit comprising a first switch element, a second switch element, a third switch element and a fourth switch element, all of which are electrically connected between the coil of the motor and the controller.

24. The motor control apparatus of claim 23, wherein the driving circuit further comprises two resistors electrically connected to the third switch element and the fourth switch element.

25. The motor control apparatus of claim 23, wherein each of the switch elements is a metal-oxide-semiconductor field-effect transistor (MOSFET).

26. The motor control apparatus of claim 20, wherein the current sensing circuit further comprises a third resistor, a fourth resistor connected to a power supply and then grounded, and a second comparator, wherein input ends of the second comparator are electrically connected to the third resistor, the fourth resistor and the first comparator, and an output end of the second comparator is electrically connected to the controller.

* * * * *